(12) United States Patent
Dyab et al.

(10) Patent No.: US 12,184,085 B2
(45) Date of Patent: Dec. 31, 2024

(54) CONTACTLESS TRANSMISSION LINE FOR WIRELESS POWER TRANSFER

(71) Applicants: Walid Dyab, Riyadh (SA); Ahmed Sakr, Giza (EG); Mourad Ibrahim, Riyadh (SA); Intikhab Hussain, Montreal (CA); Ke Wu, Montreal (CA)

(72) Inventors: Walid Dyab, Riyadh (SA); Ahmed Sakr, Giza (EG); Mourad Ibrahim, Riyadh (SA); Intikhab Hussain, Montreal (CA); Ke Wu, Montreal (CA)

(73) Assignee: HUAWEI TECHNOLOGIES CANADA CO., LTD., Kanata (CA)

(*) Notice: Subject to any disclaimer, the term of this patent is extended or adjusted under 35 U.S.C. 154(b) by 608 days.

(21) Appl. No.: 17/143,758

(22) Filed: Jan. 7, 2021

(65) Prior Publication Data

US 2022/0216729 A1 Jul. 7, 2022

(51) Int. Cl.
*H01P 3/12* (2006.01)
*B60L 50/10* (2019.01)
(Continued)

(52) U.S. Cl.
CPC .............. *H02J 50/23* (2016.02); *B60L 50/10* (2019.02); *B60L 53/10* (2019.02); *B60L 53/12* (2019.02);
(Continued)

(58) Field of Classification Search
CPC ........ H02J 50/23; H02J 7/0042; H02J 50/005; B60L 50/10; B60L 53/10; B60L 53/12;
(Continued)

(56) References Cited

U.S. PATENT DOCUMENTS 8,803,638 B2  8/2014 Kildal
9,731,614 B1* 8/2017 Sarwat .................. B60L 53/12
(Continued)

FOREIGN PATENT DOCUMENTS

CN    107681792    *  2/2018

OTHER PUBLICATIONS

C. Qiu, K. T. Chau, C. Liu and C. C. Chan, "Overview of wireless power transfer for electric vehicle charging," 2013 World Electric Vehicle Symposium and Exhibition (EVS27), Barcelona 2013.
(Continued)

*Primary Examiner* — Rexford N Barnie
*Assistant Examiner* — Xuan Ly

(57) ABSTRACT

A system for wireless power transfer (WPT) is described. The WPT system may be used for charging of electric vehicles or other mobile platforms. The WPT system includes a gap waveguide base including a conductive waveguiding structure and a bandgap structure along at least the lateral sides of the waveguiding structure. The WPT system also includes a charging plate separate from the gap waveguide base. The charging plate includes a conductive plate having a receiving structure for receiving the electromagnetic field from the gap waveguide base through an air gap. The disclosed WPT system enables propagation of an electromagnetic field through the air gap, including electromagnetic fields in the very high frequency (VHF) band.

11 Claims, 9 Drawing Sheets

(51) Int. Cl.
  B60L 53/10    (2019.01)
  B60L 53/12    (2019.01)
  H01R 24/52    (2011.01)
  H01R 31/06    (2006.01)
  H02J 7/00     (2006.01)
  H02J 50/00    (2016.01)
  H02J 50/23    (2016.01)
  H01R 103/00   (2006.01)

(52) U.S. Cl.
  CPC ............ *H01P 3/12* (2013.01); *H01R 24/52* (2013.01); *H01R 31/06* (2013.01); *H02J 7/0042* (2013.01); *H02J 50/005* (2020.01); *H01R 2103/00* (2013.01)

(58) Field of Classification Search
  CPC ........ B60L 53/38; B60L 53/39; B60L 53/122; H01P 3/12; H01P 1/2005; H01P 3/123; H01P 5/103; H01R 24/52; H01R 31/06; H01R 2103/00
  USPC .......................................................... 307/104
  See application file for complete search history.

(56) References Cited

U.S. PATENT DOCUMENTS

| | | | | |
|---|---|---|---|---|
| 10,702,644 | B2* | 7/2020 | Stark | H01F 27/2823 |
| 10,960,770 | B2* | 3/2021 | Ichikawa | B60L 53/122 |
| 2005/0140459 | A1* | 6/2005 | Tanbakuchi | H01R 24/542 |
| | | | | 333/4 |
| 2008/0142911 | A1* | 6/2008 | Berlin | H01Q 1/44 |
| | | | | 257/E21.585 |
| 2015/0194718 | A1 | 7/2015 | Kildal et al. | |
| 2016/0114686 | A1* | 4/2016 | Beattie, Jr. | B60L 53/305 |
| | | | | 320/108 |
| 2019/0379136 | A1* | 12/2019 | Kirino | H01Q 1/3233 |
| 2020/0185802 | A1* | 6/2020 | Vilenskiy | H01P 1/20 |
| 2021/0376439 | A1* | 12/2021 | Karlsson | H01P 5/107 |

OTHER PUBLICATIONS

A. El-Shahat, E. Ayisire, Y. Wu, Mosfequr Rahman, Dylan Nelms, "Electric Vehicles Wireless Power Transfer State-of-the-Art", Energy Procedia, vol. 162 2019.

S. Li and C. C. Mi, "Wireless Power Transfer for Electric Vehicle Applications," in IEEE Journal of Emerging and Selected Topics in Power Electronics, vol. 3, No. 1 Apr. 2015.

X. Wei, Z. Wang, and H. Dai, "A Critical Review of Wireless Power Transfer via Strongly Coupled Magnetic Resonances", Energies 2014.

S. Niu, H. Xu, Z. Sun, Z.Y. Shao, L. Jian, "The state-of the arts of wireless electric vehicle charging via magnetic resonance: principles, standards and core technologies", Renewable and Sustainable Energy Reviews, vol. 114 2019.

L. Sun, D. Ma, H. Tang, "A review of recent trends in wireless power transfer technology and its applications in electric vehicle wireless charging", Renewable and Sustainable Energy Reviews, vol. 91 2018.

A. Polemi, S. Maci and P. Kildal, "Dispersion Characteristics of a Metamaterial-Based Parallel-Plate Ridge Gap Waveguide Realized by Bed of Nails," in IEEE Transactions on Antennas and Propagation, vol. 59, No. 3 Mar. 2011.

A. Beltayib and A. Sebak, "Analytical Design Procedure for Forward Wave Couplers in RGW Technology Based on Hybrid PEC/PMC Waveguide Model," in IEEE Access, vol. 7 2019.

A. Ahmad, and M.S. ALam, "A Comprehensive Review of Wireless Charging Technologies for Electric Vehicles". IEEE Transactions on Transportation Electrification. vol 4., No. 1 Mar. 2018.

W. M. G. Dyab, M. S. Ibrahim, A. A. Sakr and K. Wu, "Ridge Gap Waveguide Enabled Wireless Power Transfer for Electric Vehicle Applications," 2020 50th European Microwave Conference (EuMC), Utrecht, Netherlands, Jan. 12-14, 2021, total 4 pages.

* cited by examiner

CONTACTLESS TRANSMISSION LINE FOR WIRELESS POWER TRANSFER

FIELD

The present disclosure relates to wireless power transfer, in particular a wireless power transfer system based on gap waveguides, which may be used as a contactless transmission line for charging electric vehicles.

BACKGROUND

Wireless charging of electrical and electronic devices is of growing interest. The field of wireless electrical charge may be referred to as wireless power transfer (WPT). Application of WPT include various fields and scenarios, including charging of portable electronics, charging of electrical vehicles and charging of electrical ground stations. The distance over which electrical power is to be transferred wirelessly may vary from few millimeters to hundreds of kilometers, depending on application. The medium through which electrical power is transferred can also vary from relatively simple media such as lossless air to more complex media such as in the case of biomedical implants. Regardless of application, a common challenge in WPT is related to the efficiency of electrical power transfer, which arises due to the loss of electromagnetic power in the wireless medium between the source and the load. Currently, the main WPT technologies include inductive power transfer (IPT), capacitive power transfer (CPT), near-field power transfer technologies, and radiative far-field power transfer technologies. All of those methods have been found to suffer mainly from a loss of efficiency for electrical power transfer over distances on the order of a few tens of centimeters.

The efficiency of WPT and the hazards of radiation are currently challenging parameters to be considered in the development of wireless charging technologies. Those challenges may be exacerbated in applications where a large amount of power is to be delivered wirelessly (e.g., in the range of few kilowatts, such as for charging electric vehicles and mobile platforms). Current technologies that have been deployed for use in commercial applications include IPT, CPT and strongly coupled magnetic resonators (SCMR-WPT). However, drawbacks of these technologies include low efficiency due to electromagnetic field leakage or requirement for small physical separation between receiving and transmitting coils. Further, electromagnetic field leakage does not only decrease the efficiency but may also increase the harmful radiation effects of the whole system.

Accordingly, there is a need for an improved WPT technology, including WPT technology for charging applications requiring a large amount of power to be delivered wirelessly, such as for charging electric vehicles and other mobile platforms.

SUMMARY

In various examples, the present disclosure describes a wireless power transfer (WPT) system based on a gap waveguide. The WPT system includes a charging plate that is coupled to the load (e.g., the battery of an electric vehicle or mobile platform), and a gap waveguide base that is coupled to receive electric power from an external power source. Together, the charging plate and the gap waveguide base provides a complete WPT system. The gap waveguide base may be fixed relative to the power source and the charging plate may be mobile (e.g., coupled to a mobile platform or to an electric vehicle). For example, the gap waveguide base may be fixed on or under a surface over which the charge plate may be positioned (e.g., an electric vehicle with the charging plate mounted on the bottom may drive and stop over the gap waveguide base on the ground).

The WPT system may be based on a ridge gap waveguide, or an aperture gap waveguide, for example.

The WPT system as discussed enables wireless transfer of electric power from the power source (to which the gap waveguide base is coupled) to the charging plate (and from there to a battery to which the charging plate is coupled), without requiring ohmic contact or excitations between the charging plate and the gap waveguide base. Very high efficiency in power transfer is possible (e.g., up to 100% theoretical efficiency), with possible small losses from the conductors and/or from conversion of AC to DC power.

In some examples, such as applications for charging an electric vehicle or mobile platform, the gap waveguide base may be coupled to an AC power source with frequency in the very high frequency (VHF) range (e.g., in the range of 30 to 300 MHz). However, this is not intended to be limiting.

In some example aspects, the present disclosure describes a gap waveguide base for wireless transfer of electric power to a mobile platform. The gap waveguide base includes: an adaptor coupling the gap waveguide base to an external power source; a conductive waveguiding structure coupled to the adaptor to receive an input electromagnetic field from the external power source, the waveguiding structure configured to facilitate propagation of the electromagnetic field along a longitudinal axis of the gap waveguide base; and a bandgap structure next to the waveguiding structure along at least two opposing lateral sides of the waveguiding structure, the bandgap structure having a periodicity prohibiting propagation of the electromagnetic field from the lateral sides of the waveguiding structure; wherein the gap waveguide base cooperates with a conductive charging plate, when the conductive charging plate is superimposed over and spaced apart from the gap waveguide base, to propagate the electromagnetic field from the waveguiding structure to the charging plate over an air gap.

In any of the preceding examples, the waveguiding structure may be a waveguiding ridge extending along the longitudinal axis.

In any of the preceding examples, the bandgap structure may be supported by a support layer, and the waveguiding structure may be a waveguiding aperture defined in the support layer.

In any of the preceding examples, the bandgap structure may include a plurality of conductive posts, wherein the conductive posts are positioned at a fixed periodicity.

In any of the preceding examples, the bandgap structure may be next to the waveguiding structure along at least one longitudinal end of the waveguiding structure.

In any of the preceding examples, the adaptor may be a coaxial connector.

In any of the preceding examples, the bandgap structure may have a height in the range of about 50 cm to about 75 cm.

In some example aspects, the present disclosure describes a charging plate for wireless transfer of electric power to a mobile platform. The charging plate includes: a conductive plate having a receiving structure for receiving an electromagnetic field through an air gap; and an adaptor coupling the conductive plate to a load to be charged in the mobile platform; wherein the charging plate cooperates with a gap waveguide base, when the conductive charging plate is superimposed over and spaced apart from the gap waveguide base, to receive the electromagnetic field from the waveguiding structure over the air gap.

In any of the preceding examples, the receiving structure may be a conductive planar surface of the conductive plate.

In any of the preceding examples, the receiving structure may be an aperture defined in the conductive plate.

In any of the preceding examples, the adaptor may be a coaxial connector.

In any of the preceding examples, the charging plate may be mountable to a bottom of a body of the mobile platform.

In any of the preceding examples, the charging plate may be integral with a bottom chassis of the mobile platform.

In some example aspects, the present disclosure describes a wireless power transfer system for wireless transfer of electric power to a mobile platform. The wireless power transfer system includes: a gap waveguide base including: an adaptor coupling the gap waveguide base to an external power source; a conductive waveguiding structure coupled to the adaptor to receive an input electromagnetic field from the external power source, the waveguiding structure configured to facilitate propagation of the electromagnetic field along a longitudinal axis of the gap waveguide base; and a bandgap structure next to the waveguiding structure along at least two opposing lateral sides of the waveguiding structure, the bandgap structure having a periodicity prohibiting propagation of the electromagnetic field from the lateral sides of the waveguiding structure. The wireless power transfer system also includes: a charging plate including: a conductive plate having a receiving structure for receiving the electromagnetic field from the gap waveguide base through an air gap; and an adaptor coupling the conductive plate to a load to be charged in the mobile platform; wherein the gap waveguide base cooperates with the charging plate, when the charging plate is superimposed over and spaced apart from the gap waveguide base, propagate the electromagnetic field from the waveguiding structure to the charging plate over the air gap.

In any of the preceding examples, the gap waveguide base may cooperate with the charging plate to propagate the electromagnetic field over the air gap when the charging plate is superimposed over the gap waveguide base, and when the charging plate is spaced apart from the gap waveguide base by a separation distance in the range of about 5 cm to about 50 cm, and the electromagnetic field may have a frequency in the range of about 30 MHz to about 300 MHz.

In any of the preceding examples, the separation distance may be in the range of about 10 cm to about 40 cm.

In any of the preceding examples, the separation distance may be in the range of about 15 cm to about 35 cm.

In any of the preceding examples, the charging plate may be mountable to or integral with a bottom of a body of the mobile platform, and the gap waveguide base may be underneath a surface supporting the mobile platform.

In any of the preceding examples, the waveguiding structure of the gap waveguide base may be a waveguiding ridge extending along the longitudinal axis of the gap waveguide base, and the receiving structure of the charging plate may be a conductive planar surface of the conductive plate.

In any of the preceding examples, the bandgap structure of the gap waveguide base may be supported by a support layer, the waveguiding structure of the gap waveguide base may be a waveguiding aperture defined in the support layer, and the receiving structure of the charging plate may be an aperture defined in the conductive plate.

In any of the preceding examples, the wireless power transfer system may include any of the example gap waveguide base described above, and may include any of the example charging plate described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
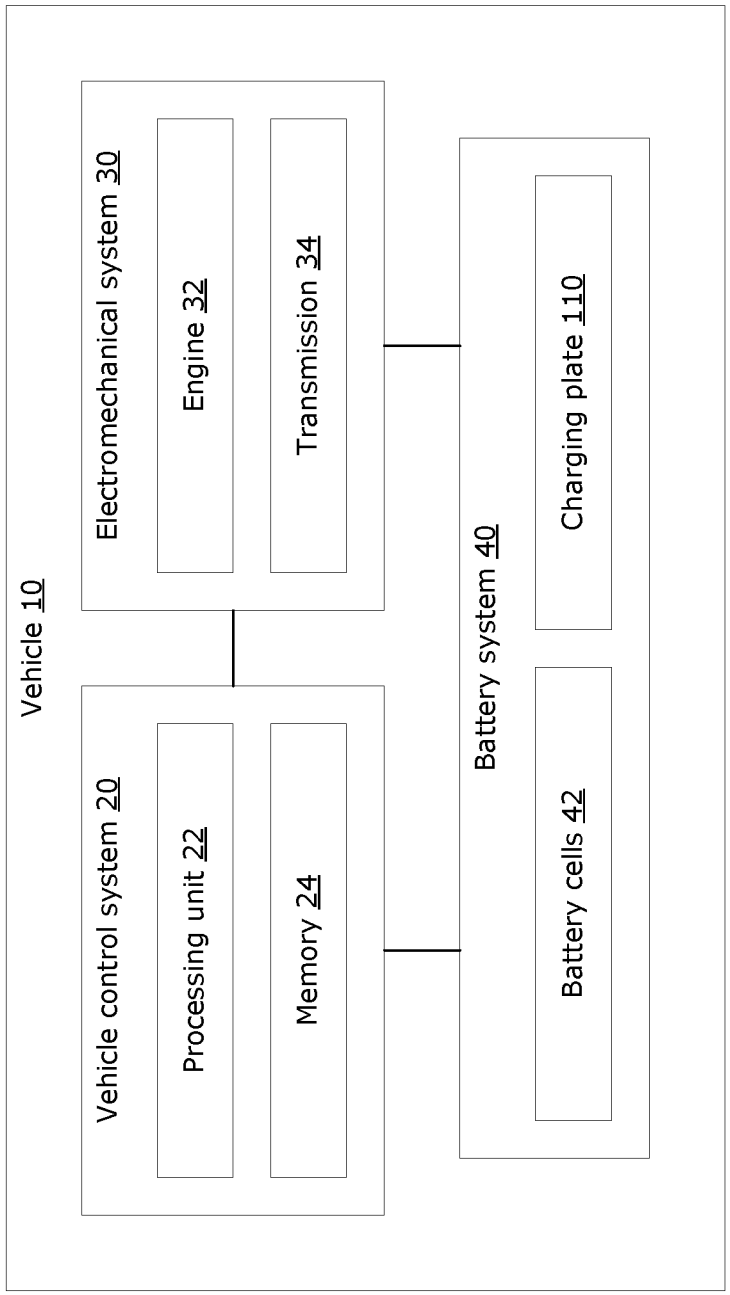
FIG. 1 is a simplified block diagram of an example electric vehicle that may implement examples of the present disclosure.

Some examples of the present disclosure are described in the context of electric vehicles. However, it should be understood that electric vehicles are only an example of mobile platforms, and the teachings of the present disclosure may be implemented for wireless charging of other electric-powered mobile platforms including, for example, trams, subways, trucks, buses, watercraft, aircraft, drones (also called unmanned aerial vehicles (UAVs)), warehouse equipment, manufacturing facility equipment, construction equipment, farm equipment, autonomous service robots such as vacuum cleaners and lawn mowers, and other mobile electric devices, including autonomous devices, semi-autonomous devices, and human-controlled (i.e., non-autonomous) devices. Further, it should be understood that the present disclosure may be implemented for wireless charging of hybrid mobile platforms (e.g., mobile platforms that run on a combination of gasoline and electrical power) as well as wireless charging of mainly non-electric mobile platforms (e.g., mobile platforms that are mainly gasoline powered but having some electric components, such as a gasoline-powered vehicle having a small electric battery).

To assist in understanding the present disclosure, some discussion of ridge gap waveguides (RGWs) (which is an example of a gap waveguide) is first presented.

A RGW is a type of low-loss metallic waveguide. A RGW typically has a metallic base supporting a metallic ridge. The ridge is surrounded by a region of periodically spaced metallic posts (also referred to as a "bed of nails"). A thin metallic plate is positioned to cover the metallic base. Typically, the walls of the metallic base extend to support the thin metallic plate at a fixed height over the metallic base, thus ensuring that there is a defined air gap between the plate and the base such that the plate does not touch the ridge and the posts. When an electromagnetic field is inputted to the metallic ridge, the electromagnetic field is confined to the air gap between the ridge and the plate, because the periodically spaced metallic posts act as a bandgap region that prohibits propagation of the electromagnetic field. Further discussion of the RGW may be found, for example in Polemi et al., "Dispersion Characteristics of a Metamaterial-Based Parallel-Plate Ridge Gap Waveguide Realized by Bed of Nails," in *IEEE Transactions on Antennas and Propagation*, vol. 59, no. 3, pp. 904-913, March 2011.

There has been interest in applying RGWs in the design of microwave devices and millimeter-wave components. Generally, RGWs (and gap waveguides in general) are bulkier than their counterparts represented by non-gap metallic rectangular waveguides, due to the need to maintain an air gap between the base and the cover plate. However, the RGWs (and gap waveguides in general) may have useful characteristics such as generally exhibiting relatively low loss as compared to non-gap waveguides. Further, gap waveguides forego the need for good electric contacts between the upper and lower metallic plates (which are used in confining and guiding electromagnetic fields in non-gap, parallel plate waveguides), because the electromagnetic field is propagated via an air gap between the base and the plate.

RGWs have been considered for high power millimeter-wave applications such as radar and satellite applications. In such applications, the design goal is to minimize the overall size of RGW-based devices while maximizing the operational bandwidth. Thus, there is currently a drive to fabricate smaller RGWs.

In the present disclosure, a wireless power transfer (WPT) system is described in which gap waveguides (including RGWs) are not intended for millimeter-wave applications and hence do not require minimization of overall size. The present disclosure describes a WPT system using gap waveguides for charging large electric loads (e.g., an electric vehicle or mobile platform). The disclosed WPT system may be referred to as a contactless transmission line (CTL). The wireless delivery of electrical power for charging electric vehicles or mobile platforms may require a large amount of power to be delivered, but generally does not require any information to be carried in the delivered electrical power. Accordingly, design constraints that are typically encountered in millimeter-wave applications (e.g., small physical size and high operational bandwidth) may not be applicable. For example, the size of the WPT system in an electric vehicle charging system may be much larger than in radar or satellite applications. Furthermore, the electric power to be wirelessly delivered via the WPT system is not modulated to carry any sort of information, therefore the operational bandwidth does not need to be high.

Figure 2:
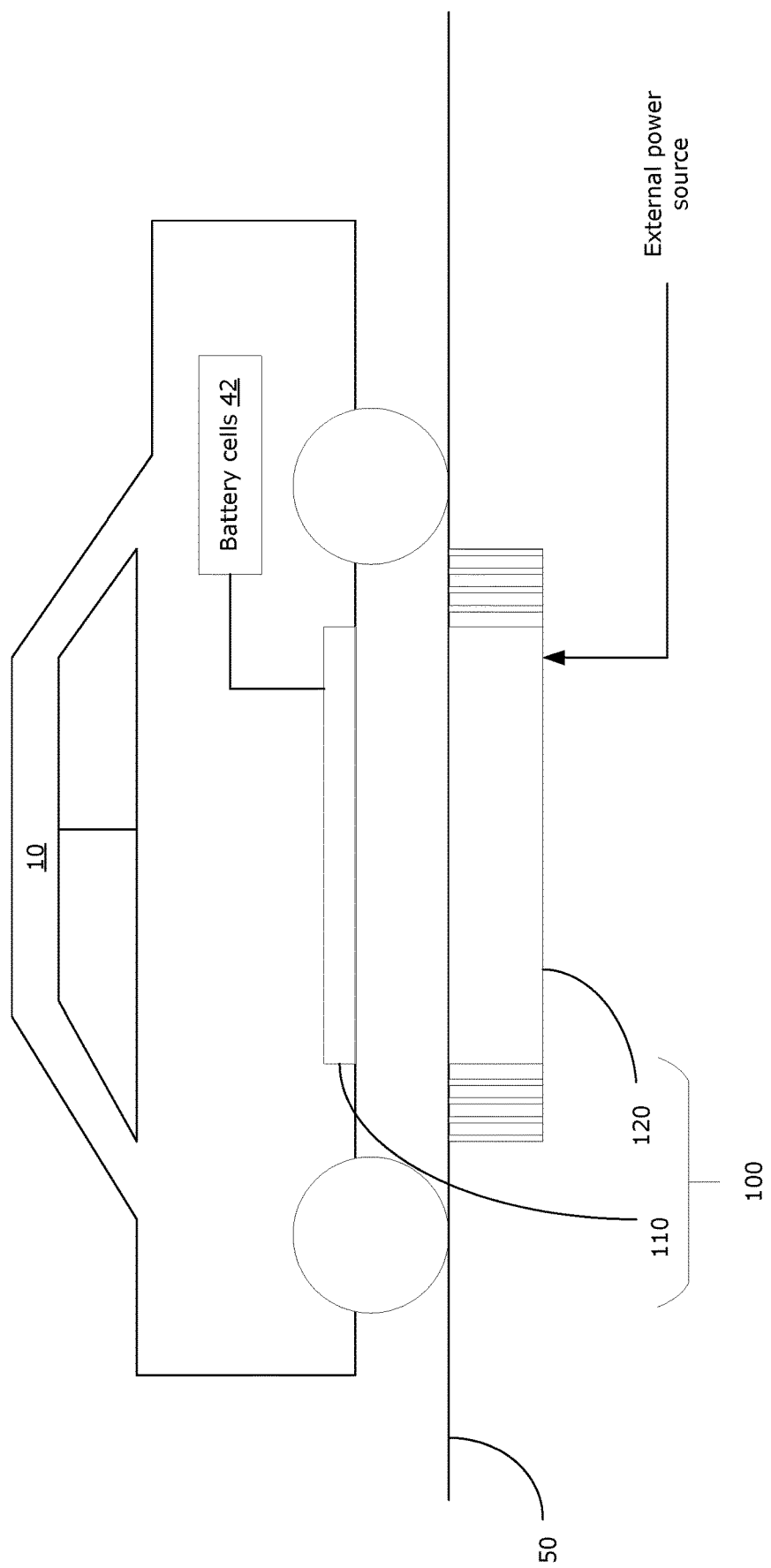
FIG. 2 is a simplified illustration of an example implementation of the disclosed WPT system for charging an electric vehicle.

FIG. 1 is a simplified block diagram that illustrates selected components of an electric vehicle 10 (also referred to herein as simply the vehicle 10) in accordance with some examples described herein. In particular, FIG. 2 illustrates an example of a WPT system 100, in accordance with embodiments of the present disclosure, that may be used to deliver electric power to the vehicle 10. FIGS. 1 and 2 will be discussed together.

As shown in FIG. 1, the vehicle 10 includes a vehicle control system 20 that is coupled to an electromechanical system 30. The vehicle control system 20 and the electromechanical system 30 are each coupled to receive electrical power from a battery system 40.

The vehicle control system 20 includes a processing unit 22 and a memory 24. The processing unit 22 may be (or may include) one or more central processing units (CPUs), one or more graphical processing units (GPUs), or one or more tensor processing units (TPUs), among other possibilities. The processing unit 22 is coupled to the memory 24 to execute software instructions stored in the memory 24. The memory 24 may contain software instructions for implementing one or more software systems, software subsystems, and software modules. For example, the memory 24 may include executable instructions for implementing an operating system of the vehicle 10. The memory 24 may also include executable instructions for implementing computer-based control of the electromechanical system 30.

The electromechanical system 30 may receive control signals from the vehicle control system 20 to operate the electromechanical components of the vehicle 10. The electromechanical system 30 may also receive control signals from manual control mechanisms of the vehicle 10 (e.g., a steering wheel, brake pedal, etc.) The electromechanical system 30 effects physical operation of the vehicle 10. The electromechanical system 30 in this simplified example includes an engine 32 and a transmission 34. The engine 32 may be a battery-powered engine, or a hybrid engine, for example. Other components may be included in the mechanical system 30, including, for example, wheels, turn signals, brake lights, fans and windows.

The battery system 40 provides electrical power to the vehicle control system 20 and to the electromechanical system 30. The battery system 40 includes one or more battery cells 42 (which may be a plurality of cells 42 connected in parallel and/or series). Electric power is stored by the battery cell(s) 42 and is discharged to power the vehicle control system 20 and the electromechanical system 30. The battery system 40 also includes a charging plate 110 that is coupled to the battery cell(s) 42.

The charging plate 110 is part of the WPT system 100, as shown in FIG. 2. The charging plate 110 cooperates with a gap waveguide base 120 to form the complete WPT system 100, to enable transfer of electric power from an external power source to the battery cell(s) 42.

In the WPT 100, includes a charging plate 110 and a gap waveguide base 120. The charging plate 110 and the gap waveguide base 120 are separate from each other. The WPT system 100 is operational for wireless transfer of electric power when the charging plate 110 is superimposed on the gap waveguide base 120 with a gap therebetween, for example as illustrated in FIG. 2 (in which the charging plate 110 is mounted on the vehicle 10).

FIG. 2 illustrates an example application of the disclosed WPT system 100 for charging the electric vehicle 10 (e.g., at a charging station). The charging plate 110 is coupled to the vehicle 10 and the gap waveguide base 120 is on or under a surface 50 (e.g., the ground) on which the vehicle 10 can drive and park. In particular, the gap waveguide base 120 may be positioned such that the top of the gap waveguide base 120 is substantially flush with the surface 50. A non-conductive protective covering (not shown) may be provided over the gap waveguide base 120 to protect the gap waveguide base 120 from the environment. The WPT system 100 is completed by the vehicle 10 positioning itself such that the charging plate 110 on the vehicle 10 superimposes and is spaced apart from the gap waveguide base 120 (e.g., the vehicle 10 parks in a parking spot where the gap waveguide base 120 is buried underneath. The charging plate 110 is positioned on the vehicle 10 (or other mobile platform) such that when the vehicle 10 is positioned over the gap waveguide base 120, the charging plate 110 is superimposed over the gap waveguide base 120 with a desired separation distance therebetween (discussed further below). Some variation in the separation distance between the charging plate 110 and the gap waveguide base 120 may be acceptable within the operational range of the WPT system 100. For example, the charging plate 110 may be mounted on or integrated with the body of the vehicle 10, at or near the bottom of the vehicle (e.g., mounted on or integrated with the lower chassis of the vehicle 10), and the clearance between the bottom of the vehicle 10 and the ground (which may vary on the order of a few centimeters, depending on the model of the vehicle 10 and weight carried by the vehicle 10), which is effectively the separation distance between the charging plate 110 and the gap waveguide base 120, may be within the acceptable range of separation distance.

As previously mentioned, the charging plate 110 and the gap waveguide base 120 of the WPT system 100 are separate from each other. Further, the charging plate 110 and the gap waveguide base 120 may be provided separately (e.g., manufactured separately, sold separately, installed separately, etc.). That is, it is not necessary for the WPT system 100 to be provided (e.g., manufactured, sold, installed, etc.) as a complete system at one time, nor does the WPT system 100 need to be owned or operated by a single owner or operator. For example, a gap waveguide base 120 may be owned by an owner of a charging station at which the gap waveguide base 120 is installed, and the charging plate 110 may be owned by an owner of the vehicle on which the charging plate 110 is mounted. Further, it is not necessary for the charging plate 110 and the gap waveguide base 120 to be provided in equal numbers. For example, a single charging station with a gap waveguide base 120 may serve to wirelessly charge multiple vehicles 10 having respective charging plates 110. However, it should be understood that the charging plate 110 and the gap waveguide base 120 cooperate to provide the operational WPT system 100, and the charging plate 110 and the gap waveguide base 120 may not be intended to be used independently of each other. Further, the term "base" is not intended to limit the gap waveguide base 120 (and the WPT system 100 as a whole) to any specific orientation (e.g., the WPT system 100 may be operational with the gap waveguide base 120 positioned above the charging plate 110, or with the gap waveguide base 120 and the charging plate 110 oriented side-by-side, among other possibilities).

Figure 3:
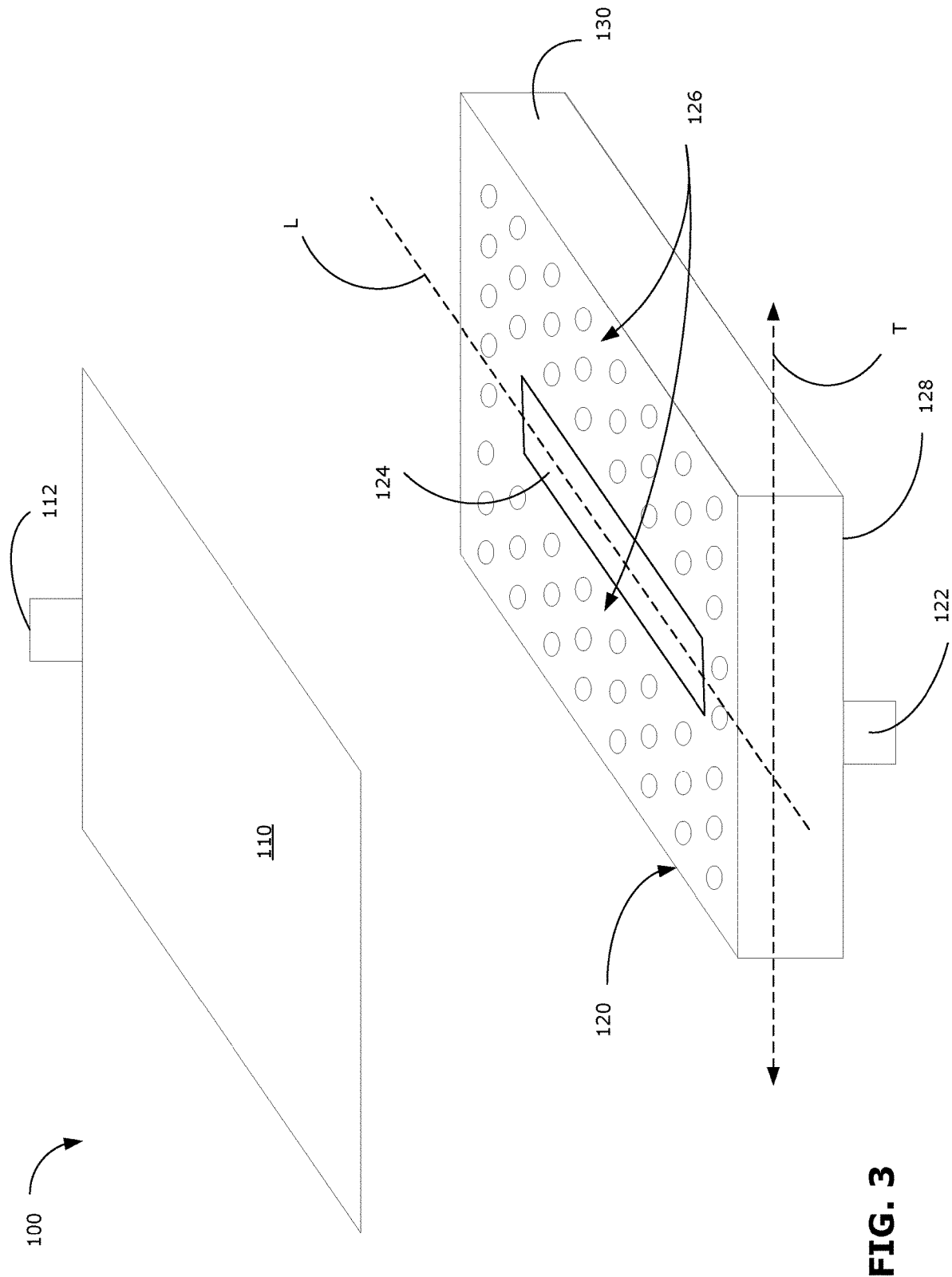
FIG. 3 is a simplified illustration of an example WPT system in accordance with examples of the present disclosure.

FIG. 3 is a simplified illustration of an example WPT system 100 as disclosed herein. As will be appreciated, the WPT system 100 may be realized in various different designs, some of which will be discussed further below. FIG. 3 illustrates some general components of the WPT system 100, and is not shown to scale.

As previously mentioned, the WPT system 100 includes a charging plate 110 and a separate gap waveguide base 120. The gap waveguide base 120 includes a first adaptor 122 that enables the gap waveguide base 120 to be coupled to an external power source, for receiving an input electromagnetic field. In particular, the first adaptor 122 is coupled to a waveguiding structure 124 that receives the input electromagnetic field. The first adaptor 122 may be any suitable power source-to-waveguide adaptor, including any suitable coaxial-to-waveguide adaptor (also referred to as coaxial-to-waveguide transition). The first adaptor 122 may, for example, be any commercially available coaxial-to-waveguide adaptor that is selected based on the waveguiding structure 124, as discussed further below. In some examples, the first adaptor 122 may be simply a coaxial connector that directly connects a power cable to the waveguiding structure.

The waveguiding structure 124 is configured to facilitate propagation of the input electromagnetic field along a longitudinal axis L of the gap waveguide base 120. Various designs may be used for the waveguiding structure 124, such as a ridge structure or an aperture, as discussed further below. A bandgap structure 126 is beside to the waveguiding structure 124 along at least two opposing lateral sides of the waveguiding structure 124. The bandgap structure 126 is designed to prohibit at least transverse propagation of the electromagnetic field (i.e., from the lateral sides of the waveguiding structure 124, in the transverse directions T) when the electromagnetic field is within a defined frequency band (which may be referred to as the stopband or bandgap). As will be discussed further below, in some examples the bandgap structure 126 may also be present beside one or both longitudinal ends of the waveguiding structure 124, to prohibit propagation of the electromagnetic field from one or both ends of the waveguiding structure 124. In particular, the bandgap structure 126 is a structure (or a material) that has a periodic variation in its dielectric constant, which gives rise to its characteristic bandgap. The bandgap structure 126 may be a composite material having a periodic variation in dielectric constant, may be a dielectric material having a periodic pattern of holes, may be a periodic arrangement of conductive posts (with air or other material of low conductivity between the posts), among other possibilities.

In some examples, the gap waveguide base 120 may include a support layer 128 (or substrate) supporting the waveguiding structure 124 and the bandgap structure 126, and keeping the waveguiding structure 124 and the bandgap structure 126 fixed relative to each other. In some examples, the gap waveguide base 120 may also include walls 130 surrounding the waveguiding structure 124 and the bandgap structure 126. The walls 130 and the bandgap structure 126 should be of substantially equal height, such that the gap waveguide base 120 can be placed underneath and substantially flush with the surface 50 over which the vehicle 10 may drive. The support layer 128 and the walls 130 may be conductive or non-conductive, and may generally serve to protect the waveguiding structure 124 and the bandgap structure 126 and/or to provide structural integrity to the gap waveguide base 120.

The charging plate 110 has a complementary receiving structure (not shown in FIG. 3, discussed further below) to receive the electromagnetic field from the waveguiding structure 124 of the gap waveguide base 120. The complementary receiving structure of the charging plate 110 is coupled to a second adaptor 112 for coupling the charging plate 110 directly or indirectly to the battery cell(s) 42 of the vehicle 10 (or other mobile platform). For example, the second adaptor 112 may couple the charging plate 110 to an AC-to-DC power converter (not shown) that coverts the received electromagnetic field to a DC power that can be stored in the battery cell(s) 42. The second adaptor 112 may be any suitable waveguide-to-power cable adaptor, including any suitable waveguide-to-coaxial adaptor (also referred to as waveguide-to-coaxial transition). The second adaptor 112 may, for example, be any commercially available waveguide-to-coaxial adaptor that is selected based on the complementary receiving structure, as discussed further below. In some examples, the second adaptor 112 may be simply a coaxial connector that directly connects the complementary receiving structure to a power cable.

In operation, the charging plate 110 is superimposed over and approximately parallel with the gap waveguide base 120 with a separation distance therebetween. An electromagnetic field from the external power source is inputted to the waveguiding structure 124 and propagates longitudinally along the waveguiding structure 124. The bandgap structure 126 prohibits propagation of the electromagnetic field in at least the transverse directions T. For an electromagnetic field having a frequency within the defined bandgap, the bandgap structure 126 defines a region of space over which the electromagnetic energy is prohibited to penetrate. The result is that, the electromagnetic field inputted at the waveguiding structure 124 (e.g., inputted via the first adaptor 122) propagates in the air gap region between the charging plate 110 and the waveguide base 120 without penetrating into the region of the bandgap structure 126 (e.g., without propagation from the lateral sides of the waveguiding structure 124).

The design of the WPT system 100 helps to ensure that the electromagnetic field is confined to the region of air space between the charging plate 110 and the waveguide base 120. This confinement means that the electromagnetic field is guided by an air gap, not a metallic conductor as in conventional non-gap waveguides. The result is that the WPT system 100 provides contactless transfer of electrical power from a source (e.g., the external power source connected to the gap waveguide base 120) to a load (e.g., the battery cell(s) 42 connected to the charging plate 110). Thus, the WPT system 100 may act as a contactless transmission line, for contactless delivery of large amounts of electric power. It should be noted that the electromagnetic field propagates along the waveguiding structure 124 with theoretical loss only limited to that of the conductivity of the waveguiding structure 124, meaning that the theoretical efficiency by which the electromagnetic field propagates may be as high as 100%.

The WPT system 100, as disclosed, presents a category of WPT technology that is different from conventional inductive power transfer (IPT) and capacitive power transfer (CPT) technologies. In the disclosed WPT system 100, there are no coils to be designed as in conventional IPT technologies (IPT technologies are similar to transformers, except for the magnetic core is omitted). The disclosed WPT system 100 is also different from conventional CPT technologies. The power delivery in CPT is due to the displacement current in the region between two capacitive plates, which limits the effective separation between the source and the load to no more than a few millimetres (and thus impractical for charging electric vehicles or other mobile platforms). It should also be noted that the disclosed WPT system 100 does not fall in the category of radiative technology or strongly coupled magnetic resonator (SCMR) technology. In radiative technology, the power from the source is radiated via a transmitting antenna. SCMR technology is considered a form of mid-range radiative WPT, and also is based on a radiating antenna. In both radiative technology and SCMR technology, the antenna is capable of radiation regardless of whether the load is present or not. In contrast, the disclosed WPT system 100 is operational to deliver power only after the charging plate 110, which is connected to the load (e.g., battery cell(s) of an electric vehicle or mobile platform), is superimposed over the gap waveguide base 120. In other words, the WPT system 100 inherently prevents delivery of power when the load is not present. Accordingly, the disclosed WPT system 100 may provide advantages and practical applications over some conventional WPT technologies.

Figure 4A:
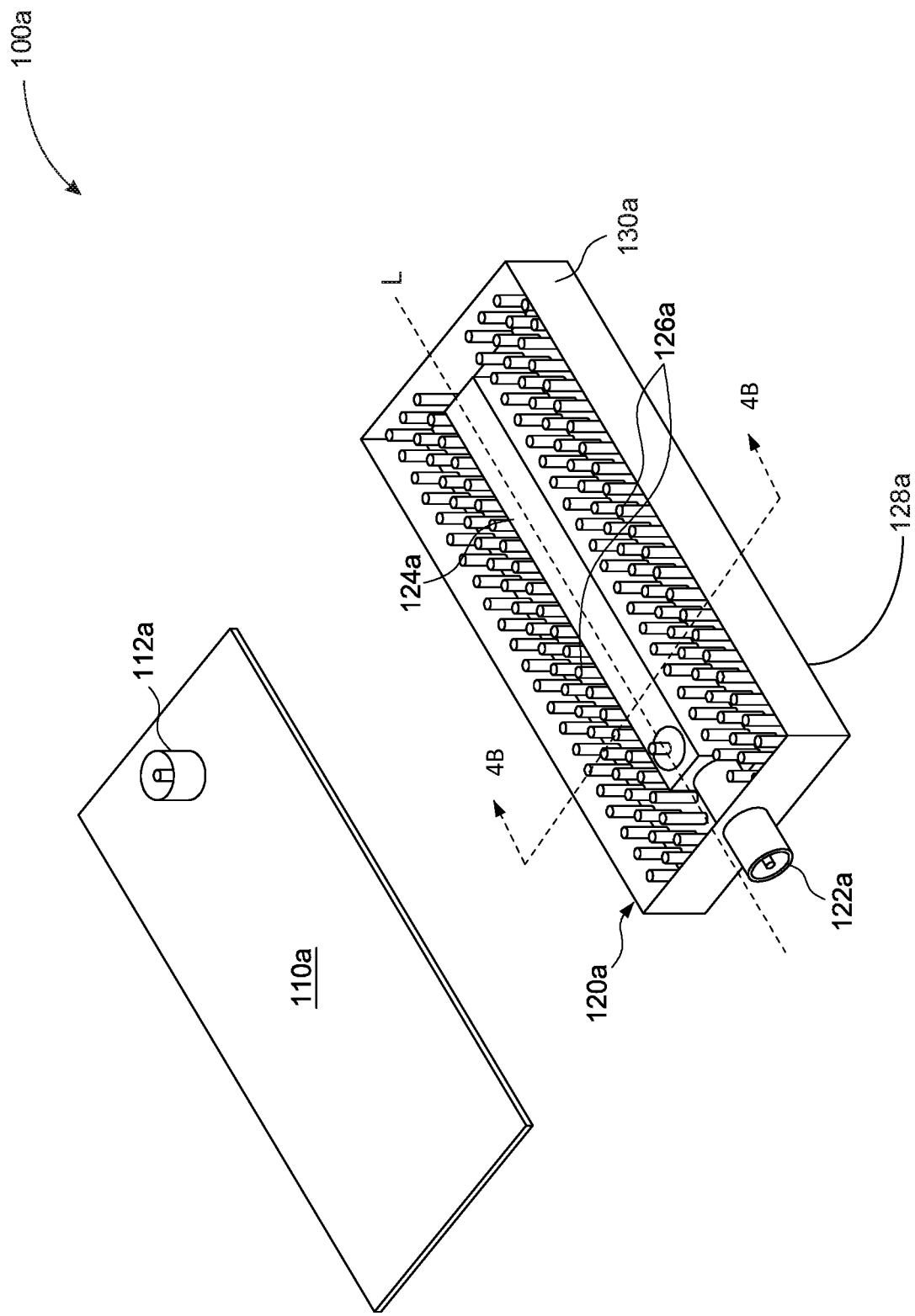
FIG. 4A is a perspective view of another example WPT system in accordance with examples of the present disclosure.

FIG. 4A illustrates another example of the disclosed WPT system, showing some example implementation details. The example WPT system 100a of FIG. 4A includes an embodiment of the charging plate 110a and the gap waveguide base 120a.

The gap waveguide base 120a includes a conductive waveguiding ridge 124a, as the waveguiding structure, extending along the longitudinal axis L. The first adaptor is a first coaxial connector 122a that enables a direct connection from a power cable (which is connected to an external power source) to the waveguiding ridge 124a. The gap waveguide base 120a includes a plurality of conductive posts 126a having a fixed periodicity as the bandgap structure along at least two opposing lateral sides of the waveguiding ridge 124a. The waveguiding ridge 124a and posts 126a are supported by a support layer 128a and surrounded by walls 130a. The support layer 128a and walls 130a may be formed of the same conductive material as the waveguiding ridge 124a and posts 126a (e.g., for ease of manufacturing).

The complementary receiving structure on the charging plate 110a is the conductive planar surface of the charging plate 110a itself. The second adaptor is a second coaxial connector 112a that enables a direct connection to a power cable (which is connected to a load, such as the battery cell(s) of a vehicle or other mobile platform). Some design considerations are now discussed in the context of the WPT system 100a, with reference to FIG. 4B.

Figure 4B:
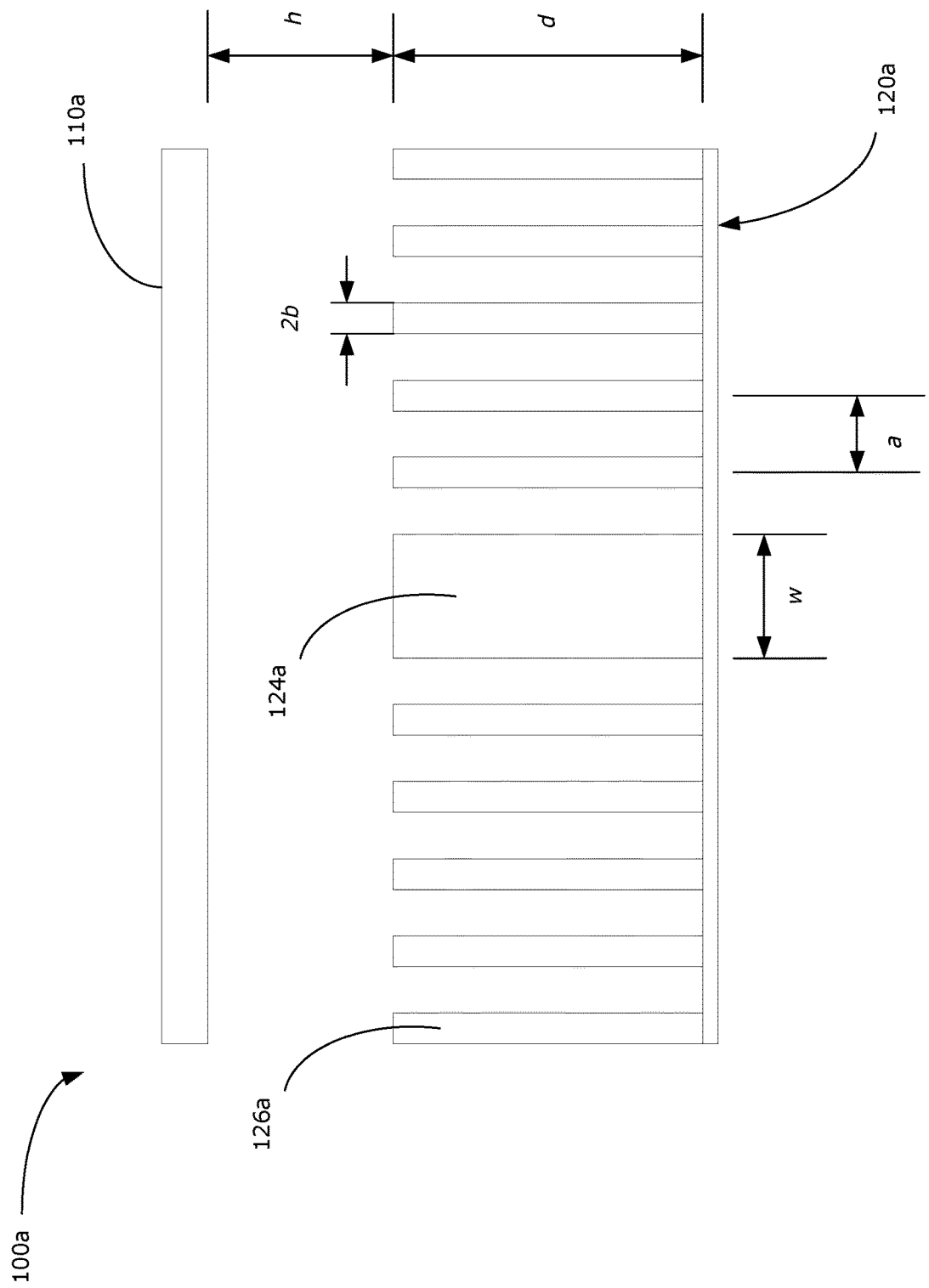
FIG. 4B is a transverse cross-sectional view of the example WPT system of FIG. 4A.

FIG. 4B shows a transverse cross-sectional view of the WPT system 100a (along line 4B-4B of FIG. 4A), when the charging plate 110a is superimposed over the gap waveguide base 120a. The components illustrated in FIG. 4B are not shown to scale, and some dimensions may be exaggerated in FIG. 4B for clarity.

First, some notation is introduced. As indicated in FIG. 4B, a denotes the period of the bandgap structure. In the example where the bandgap structure is a plurality of periodic conductive posts 126a, a denotes the distance from the center of one post 126a to the center of an immediately adjacent post 126a. b denotes a radius of one post 126a (in which each post 126a is modeled as a cylinder). More generally, b denotes the half-width of a periodic conductive portion of the bandgap structure. w denotes the lateral (or transverse) width of the waveguiding structure; in this example w denotes the width of the waveguiding ridge 124a. d denotes the height of the bandgap structure; in this example d denotes the height of the posts 126a. h denotes the separation distance between the charging plate 110a and the upper plane of the gap waveguide base 120a (defined by the height of the bandgap structure, namely the posts 126a in this example).

The dispersion relation (which may be plotted as a frequency-wavenumber ($\omega$–k) diagram) can be solved for as the solution of the following transcendental equation (referred to herein as equation (1)):

$$\frac{k_y}{k}\tan(k_y h) + \left[1 - \frac{k^2 - k_y^2}{k_p^2 + k^2 - k_y^2}\right]\tan(kd) +$$

$$\frac{k^2 - k_y^2}{k_p^2 + k^2 - k_y^2} \frac{\sqrt{k_p^2 - k_y^2}}{k} \tanh\left(\sqrt{k_p^2 - k_y^2}\, d\right) = 0$$

where k is the free space wavenumber, k=$\omega$/c; $\omega$ is the radial frequency of the electromagnetic field; and c is the speed of light in free space; and $k_y$ and $k_p$ are defined as follows:

$$k_y = \frac{\pi}{(h+d)}$$

$$k_p = \frac{1}{a}\sqrt{\frac{2\pi}{\ln\left(\frac{a}{2\pi b}\right) + 0.5275}}$$

where the constant 0.5275 is calculated for r=1 from the equation $$F(r) = -0.5\ln(r) + \sum_{n=1}^{\infty}\left(\frac{\coth(n\pi r) - 1}{n}\right) + \frac{\pi r}{6}$$

where r=1 corresponds to the case where the periodicity of the bandgap structure (the pasts 126a in this example) is equal in the L and T directions of FIG. 3.

Typically, there is a bandgap (in which there is no real ω solution for equation (1)) where the electromagnetic field is not allowed to penetrate in the region between the posts 126a and the charging plate 110a. This means that, when the charging plate 110a is positioned superimposed over the gap waveguide base 120a (e.g., as shown in FIG. 4B), the excited electromagnetic field is confined to the region above the waveguiding ridge 124a when the frequency of the electromagnetic field is within the bandgap.

If the dimensions denoted by a, b, h and d are in the range of a few millimeters, the first bandgap in the solution of equation (1) occurs in the millimeter-wave band (e.g., at a few tens of GHz). This is the aim of most conventional RGW designs. In contrast, in the present disclosure, the WPT system 100a and the disclosed WPT system 100 in general is intended for other applications and supports designs using much larger dimensions and at a lower range of frequencies. The different design goals of the disclosed WPT system 100 results in some advantages over conventional RGW designs. In the disclosed WPT system 100, the electronics and components required for generating the electromagnetic power to be delivered wirelessly is relatively easy to fabricate (e.g., because the requirement to minimize physical size is not applicable). The physical size of the disclosed WPT system 100 is also suitable for wireless charging of electric vehicles or other mobile platforms with self-shielding properties (e.g., radiation of the electromagnetic field is naturally confined). Further, the disclosed WPT system 100 supports wireless delivery of electrical power over a separation distance h in the range of a few centimeters to a few tens of centimeters. In this range, the disclosed WPT system 100 has high power handling capability, enabling wireless transfer of up to a few kilowatts of power or more.

An example of a practical application of the WPT system 100a of FIGS. 4A and 4B is now described, with some example dimensions. It should be understood that this example is not intended to be limiting. For example, a person of ordinary skill in the art would understand that the dimensions may be varied without undue experimentation, for example in order to achieve wireless charging of electric vehicles or other mobile platforms using different frequencies. For example, the dimension a, b, d, h and w may each be independently variable in the range of a few centimeters (e.g., from 1 cm to about 5 cm) up to several tens of centimeters (e.g., from 10 cm to 30 cm to 50 cm to 75 cm or more). Some example dimensions are described below, however it should be understood that similar performance may be achieved within variations of ±5 cm or ±10 cm, for example.

In an example, consider the WPT system 100a having the following dimensions: a=20 cm, b=5 cm, d=75 cm and h=30 cm. Using the above equations, it can be determined that the first bandgap appears at the very high frequency (VHF) range (e.g., in the range of 30 to 300 MHz), in particular in the range from 100 to 145 MHz. It should be appreciated that the dimensions a, b, h and d may be varied (e.g., increased or decreased by a few centimeters), and still arrive at a bandgap within the VHF range. It should also be appreciated that this range of dimensions and frequencies typically are not found in conventional RGW technology, because conventional RGW technology is mostly focused on millimeter-wave applications (which impose size limitations as mentioned earlier). In contrast, the dimensions of the disclosed WPT system 100 is compatible with the typical clearance between the bottom surface of an electric vehicle and the ground (e.g., h=30 cm).

Using the dimensions a=20 cm, b=5 cm, d=75 cm and h=30 cm, the width of the waveguiding ridge 124a (i.e., the dimension w) may be selected to be 40 cm. In operation (when the charging plate 110a is superimposed over the gap waveguide base 120a and an input electromagnetic field is provided to the gap waveguide base 120a), the electromagnetic field is be confined above the waveguiding ridge 124a and does not penetrate into the region above the bandgap structure (in this example, the posts 126a) when the frequency of the electromagnetic field is within the calculated bandgap (in accordance with equation (1)).

Figure 4C:
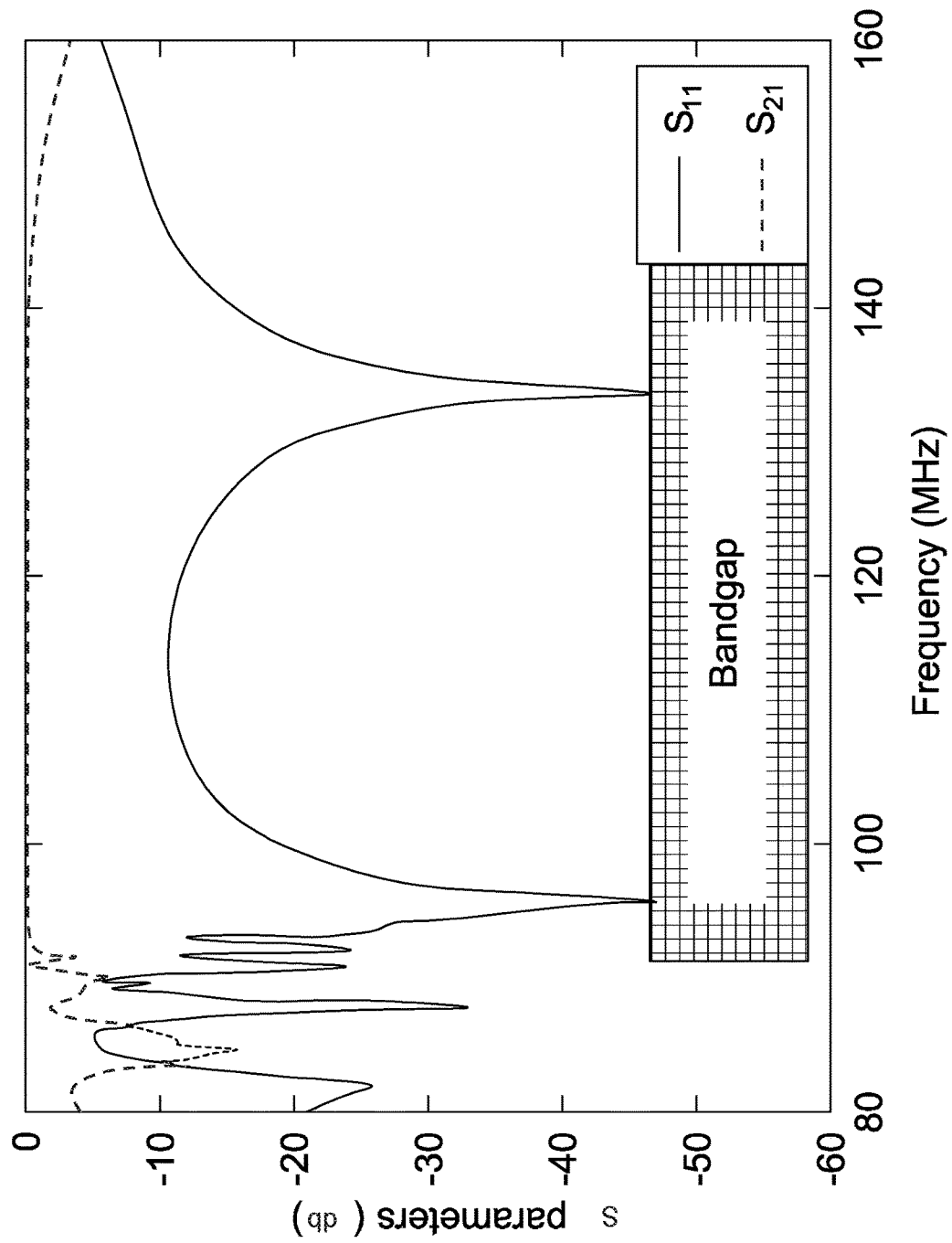
FIG. 4C is a plot of a simulated frequency response of the example WPT system of FIG. 4A.

FIG. 4C is a plot of the frequency response of a simulated WPT system 100a having the dimensions a=20 cm, b=5 cm, d=75 cm, h=30 cm and w=40 cm. In this example simulation, the WPT system 100a an input electromagnetic field was simulated over a bandwidth from 80 to 160 MHz. FIG. 4C plots the S-parameters (S21 and S11) in dB. As shown in this plot, the transmission coefficient S21 has a simulated theoretical value of 0 dB, which corresponds to a theoretical power transfer efficiency of 100%. This appears only within the bandgap (indicated by the hatched area of the plot) caused by the periodic posts 126a. Other simulations (not shown) have found that as h increases, the bandwidth of the bandgap decreases. One skilled in the art would understand how to select a frequency for the input electromagnetic field such that the WPT system 100a is capable of efficient wireless power transfer over a range of values for h (e.g., to accommodate for possible variations in the clearance between the bottom chassis of a vehicle and the ground, for example due to differences in vehicle model, vehicle weight, tire pressure, etc.). It should be understood that the thickness of the charging plate 110a, the thickness of the support layer 128a and the thickness of the walls 130a may have little or no effect on the efficiency of power transfer. For example, the thickness of the support layer 128a and the thickness of the walls 130a may be selected to be any arbitrary thickness, for example any thickness that provides sufficient structural integrity and low manufacturing cost may be selected for each of the charging plate 110a, the support layer 128a and the walls 130a (e.g., a thickness of a few centimeters may be suitable).

The periodicity of the posts 126a is selected to control the bandgap, and should correspond to the frequency of the electromagnetic field that is to be confined (i.e., the frequency of the input electromagnetic field that is to be received by the charging plate 110a). For example, if the input electromagnetic field from the electrical power source is a sinusoidal carrier in the VHF band, the periodicity of the posts 130 may be in the range of a few centimeters to a few tens of centimeters. It should be understood that the periodicity of the posts 126a may be different for different frequencies of electromagnetic fields (and conversely different frequencies of electromagnetic fields may be used as input depending on the periodicity of the posts 126a).

Figure 4D:
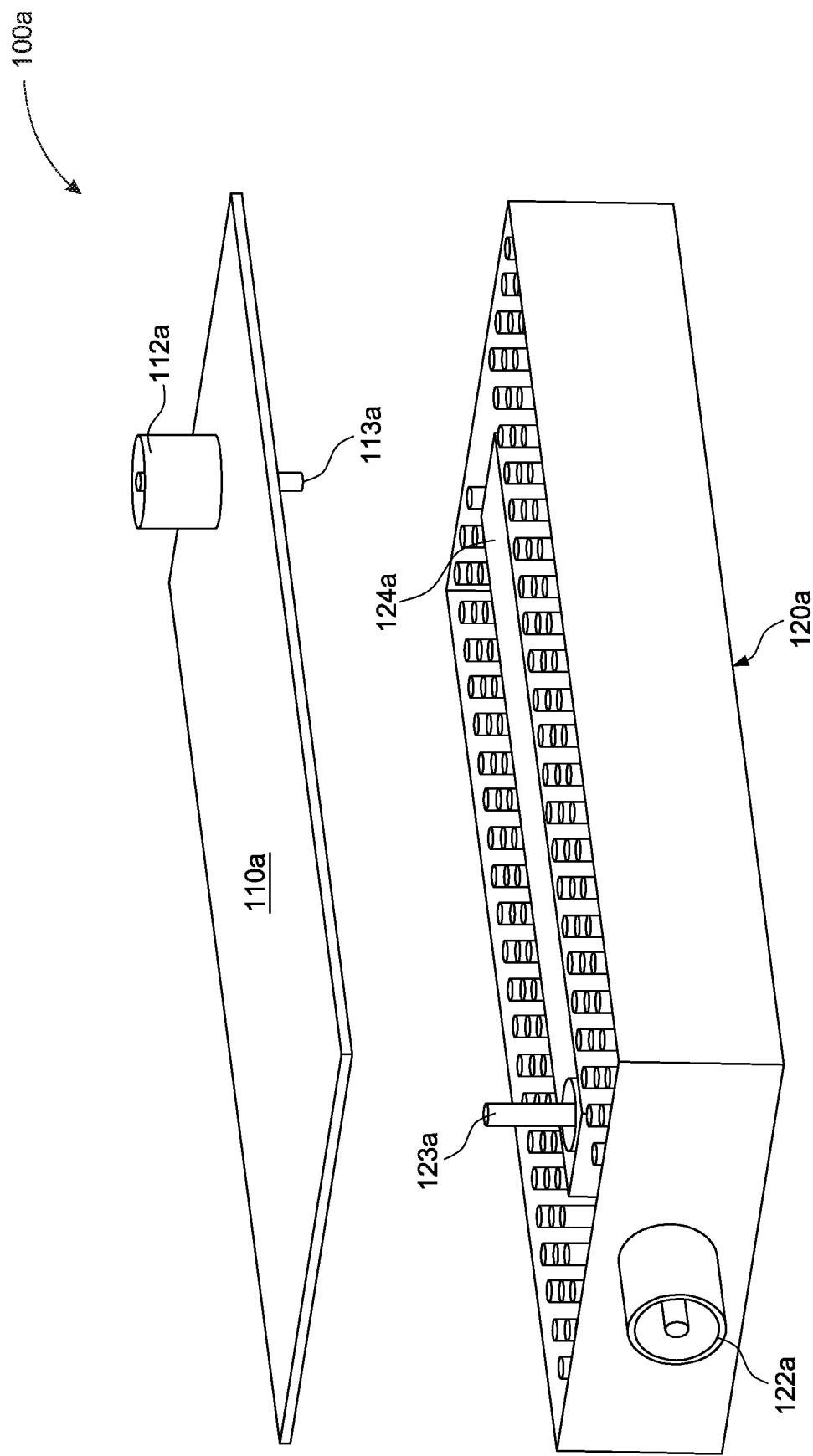
FIG. 4D is another perspective view of the example WPT system of FIG. 4A.

Reference is now made to FIG. 4D. As previously mentioned, the WPT system 100 requires a transition (or first adaptor 122) from the external power source to the gap waveguide base 120, and another transition (or second adaptor 112) from the charging plate 110 to the load. In the example WPT system 100a of FIG. 4A, the adaptors 122a, 112a are in the form of coaxial probes each having respective inner probes 123a, 113a. The inner probe 123a of the first adaptor 122a extends from the waveguiding ridge 124a and penetrates partially into the air gap between the gap waveguide base 120a and the charging plate 110a. On the charging plate 110a, the inner probe 113a of the second adaptor 112a connected to the load also penetrates partially into the air gap. The penetration of the respective inner probes 123a, 113a into the air gap enables the electromagnetic wave, propagated by the waveguiding ridge 124a, to be received by the charging plate 110a and into the power cable connected to the load (e.g., the battery cell(s) of the electric vehicle).

Figure 4E:
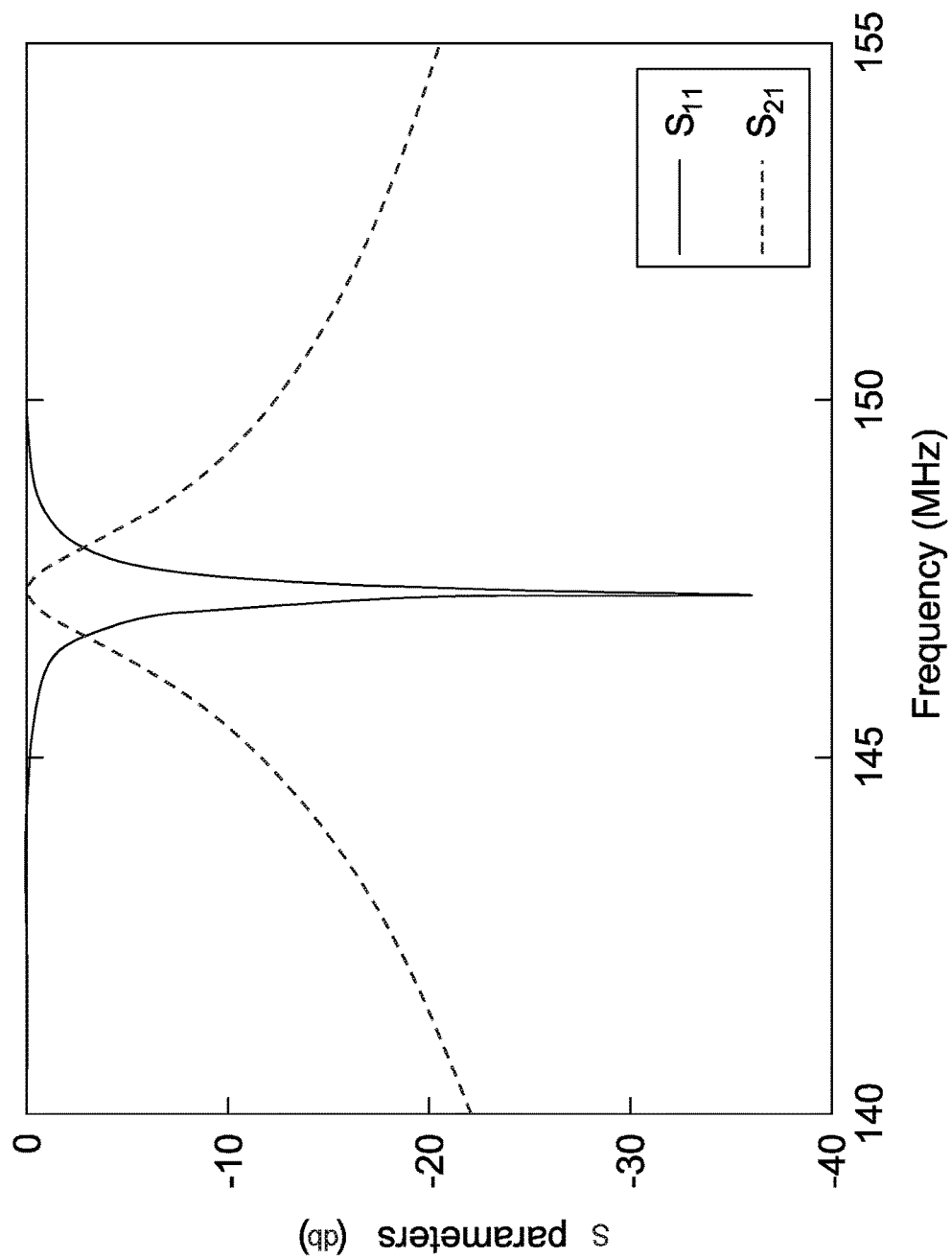
FIG. 4E is a plot of a simulated frequency response of a waveguide model that may be used for optimization calculations for the example WPT system of FIG. 4A.

Optimization calculations may be performed to determine the penetration distance of the inner probes 123a, 113a into the air region in which the field is to be excited. This optimization may be non-trivial, for example because significant computation (e.g., requiring a long computation time and/or a large amount of processing power) is typically needed for the full-wave solution of the periodic structure of the periodic posts 126a. However, it is possible to approximate this optimization using waveguide model consisting of horizontal perfect electric conductor (PEC) plates and vertical perfect magnetic conductor (PMC) wall. A solution may be calculated relatively quickly for this PEC/PMC model, compared to the real gap waveguide base structure, and the PEC/PMC model should provide a sufficiently accurate estimation for the required design parameters. S-parameters calculated from simulation of the PEC/PMC model is shown in the plot of FIG. 4E. The S-parameter plot indicates a 0 dB transmission coefficient achieved at a frequency of about 147 MHz, which requires the inner probes 123a, 113a to each extend into the air gap for a distance of 14.8 cm, and for the inner probes 123a, 113a to each be positioned at a distance of about 6 cm from respective longitudinal ends of the waveguiding ridges 124a. It should be noted that these dimensions for the inner probes 123a, 113a may be determined through routine parametric analysis, for example by simulating performance of the SPT system 100a for a range of different values for each dimensional parameter until the desired performance is achieved. It should be understood that similar simulations may be performed to determine the penetration distance and position of the inner probes 123a, 113a for other electromagnetic field frequencies (e.g., other frequencies in the VHF band).

In the example WPT system 100a, the highest efficiency in wireless transfer of electric power may be achieved when the inner probe 113a of the charging plate 110a is aligned with the inner probe 123a of the gap waveguide base 120a along the longitudinal axis L, and the inner probe 113a is positioned at a distance from one longitudinal end of the waveguiding ridge 124a that is the same as the distance of the inner probe 123a from the other longitudinal end of the waveguiding ridge 124a. It should be understood that, although optimal efficiency may be achieved when the charging plate 110a is superimposed over (but at a separate distance from) the gap waveguide base 120a in such an alignment, wireless power transfer may nonetheless be achieved at acceptable efficiency (e.g., over 50% efficiency, or over 80% efficiency) when the charging plate 110a is not perfectly aligned with the gap waveguide base 120a. One skilled in the art would be able to perform routine simulations and/or routine testing, to determine the amount of misalignment that can be tolerated. At an electric charging station, alignment of the charging plate 110a (which may be mounted on the bottom of an electric vehicle or mobile platform to be charged) and the gap waveguide base 120a (which may be under the surface on which the electric vehicle or mobile platform is parked) may be assisted by the use of, for example, vehicle sensors, physical guiding rails and/or software guidance (e.g., in the case of autonomous or semi-autonomous vehicles and mobile platforms), among other possibilities.

In some examples, the waveguiding structure (e.g., the waveguiding ridge 124a) may be terminated with an effective open circuit. This open circuit may be realized by having the bandgap structure (e.g., the periodic posts 126a) present beside the longitudinal ends of the waveguiding structure (e.g., as shown in FIG. 3).

Figure 5:
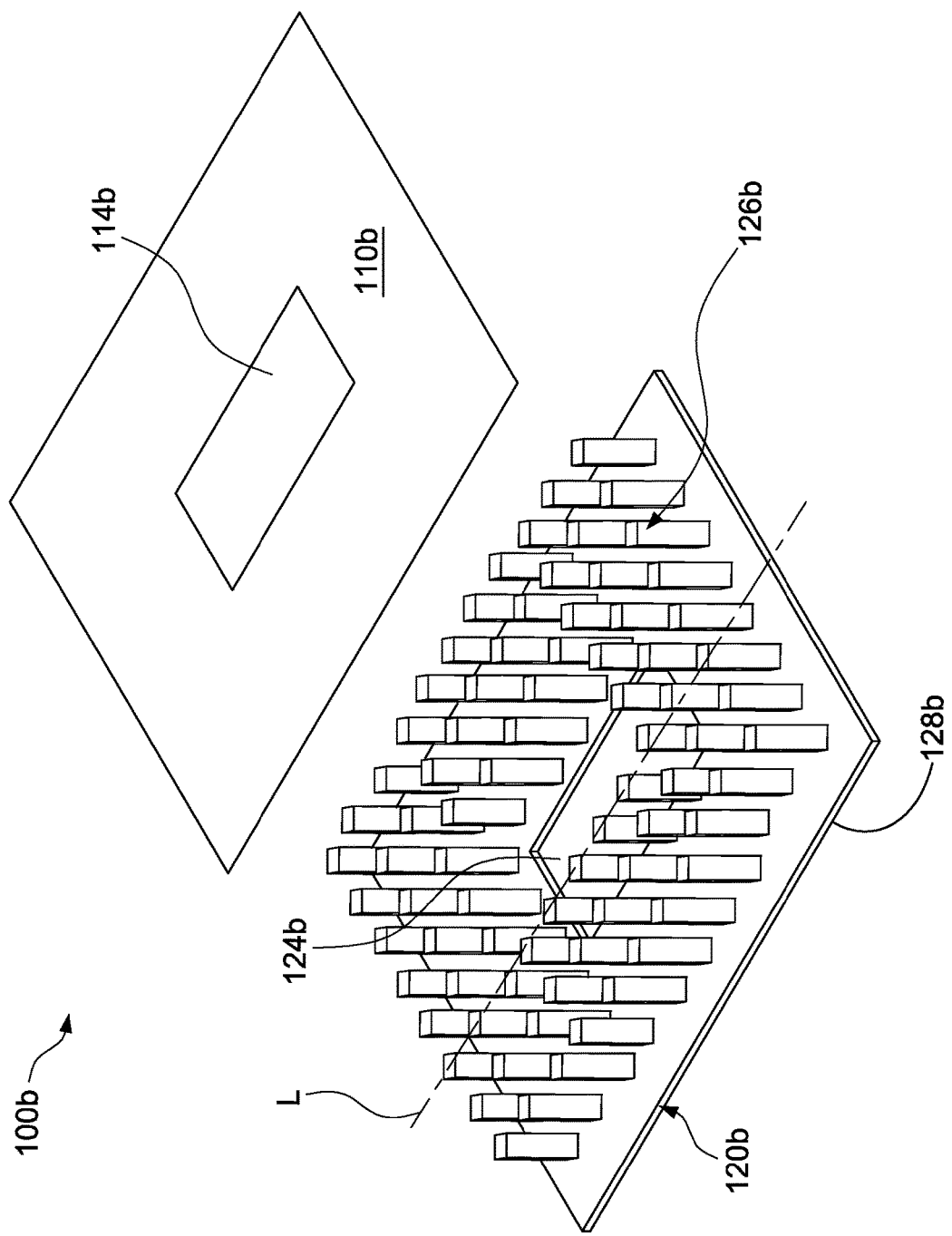
FIG. 5 is a perspective view of another example WPT system in accordance with examples of the present disclosure.

FIG. 5 illustrates another example of the disclosed WPT system, showing some example implementation details. The example WPT system 100b of FIG. 5 includes an embodiment of the charging plate 110b and the gap waveguide base 120b.

The gap waveguide base 120b includes a waveguiding aperture 124b, as the waveguiding structure, extending along the longitudinal axis L. The first adaptor (not shown) may be any suitable coaxial-to-waveguide adaptor (e.g., any suitable commercially available adaptor, such as the WR340 adaptor) that enables a power cable (which is connected to an external power source) to deliver an input electromagnetic field to the waveguiding aperture 124b. The gap waveguide base 120b includes a plurality of periodic conductive posts 126b as the bandgap structure along at least two opposing lateral sides of the waveguiding aperture 124b. Compared to the example gap waveguide base 120a of FIG. 4A, the example gap waveguide base 120b of FIG. 5 has non-cylindrical posts 126b (e.g., the posts 126b may be modelled as rectangular prisms), which are present on both lateral sides and also both longitudinal ends of the waveguiding aperture 124b. The waveguiding aperture 124b and posts 126b are supported by a support layer 128b, and the waveguiding aperture 124b is defined in the support layer 128b. In this example, there are no walls surrounding the waveguiding aperture 124b and posts 126b. The support layer 128a may be formed of the same conductive material as the waveguiding aperture 124b and posts 126b (e.g., for ease of manufacturing).

The complementary receiving structure on the charging plate 110b is a receiving aperture 114b defined in the charging plate 110b. The receiving aperture 114b may have dimensions similar to the dimensions of the waveguiding aperture 124b. In other examples, the receiving aperture 114b may have larger or smaller dimensions than the dimensions of the waveguiding aperture 124b (e.g., to enable easier alignment of the receiving aperture 114b over the waveguiding aperture 124b. The second adaptor (not shown) may be any suitable waveguide-to-coaxial adaptor (e.g., any suitable commercially available adaptor, such as the WR340 adaptor) that enables a power cable (which is connected to a load, such as the battery cell(s) of a vehicle or other mobile platform) to receive an electromagnetic field from the receiving aperture 114*b*.

The example WPT system 100*b* of FIG. 5 may be more forgiving of misalignment between the charging plate 110*b* and the gap waveguide base 120*b*, compared to the example WPT system 100*a* of FIG. 4A.

The calculation of dimensions and corresponding bandgap for the WPT system 100*b* of FIG. 5 may be performed similarly to that described above (e.g., using equation (1)), to enable wireless transfer of electric power using an input electromagnetic field in the VHF band.

The present disclosure has described some example embodiments of a disclosed WPT system 100, which may function as a contactless transmission line, for charging of electric vehicles and other mobile platforms. It should be understood that the present disclosure is not intended to be limited to the specific embodiments described.

For example, the waveguiding structure 124 on the gap waveguide base 120 of the WPT system 100 may be a waveguiding ridge 124*a*, a waveguiding aperture 124*b*, or other waveguiding structure (e.g., a pattern of ridges, a cylinder, etc.) having a suitable geometry. Similarly, the complementary receiving structure on the charging plate 110 of the WPT system 100 may be any suitable structure capable of receiving an electromagnetic field from the waveguiding structure 124. In another example, the bandgap structure 126 may be any material or structure having suitable periodic modulation of dielectric constant to give rise to the bandgap at the desired frequency band (e.g., the VHF band). The bandgap structure 126 may, for example, be a plurality of periodic cylindrical posts 126*a*, a plurality of periodic rectangular posts 126*b*, a plurality of periodic cones (or inverted cones), or a material with periodic holes, among other possibilities. Depending on the specific geometries used, the dimensions of the WPT system 100 for efficient wireless transfer of electric power may be determined through routine testing and/or simulation, as would be understood by one skilled in the art.

The charging plate 110 and the gap waveguide base 120 may be made of any conductive material (and not necessarily the same conductive material). For example, any conductive metal, such as aluminum, steel, iron, zinc, etc. may be used in manufacturing the components of the WPT system 100. The gap waveguide base 120 may be manufactured as an integral structure, or the components of the gap waveguide (e.g., the bandgap structure 126 and the waveguiding structure 124) may be manufactured separately. It should be understood that various manufacturing techniques and materials may be used within the scope of the present disclosure.

In general, the disclosed WPT system is designed for wireless transfer of electric power when a charging plate, which is separate from a gap waveguide base, is superimposed over the gap waveguide base and at a separation distance of on the order of centimeters to tens of centimeters from the gap waveguide base. For example, the charging plate may be positioned on or near the bottom chassis of an electric vehicle or other mobile platform that can be driven over or parked over a gap waveguide base (e.g., positioned on or under the driving surface). The separation of the charging plate from the gap waveguide base is inherently controlled by the clearance from the bottom chassis of the electric vehicle or mobile platform to the driving surface with some acceptable variation (e.g., depending on the model of the vehicle, the size and pressure of the vehicle wheels, the weight of the vehicle, etc.). This clearance is typically in the range of a few centimeters to a few tens of centimeters (e.g., in the range of about 10 cm to about 30 cm, or about 5 cm to about 50 cm). When the separation between the charging plate and the gap waveguide base is in the range of a few centimeters to a few tens of centimeters, the frequency of the electromagnetic field that may be used for wireless power transfer may be calculated (e.g., using the above equations) to be in the VHF band. For example, simulation results disclosed herein have shown that when the separation between the charging plate and the gap waveguide base is 30 cm, wireless power transfer is possible at the VHF band with theoretical 100% efficiency.

Further, it should be understood that scaling of the disclosed WPT system (e.g., increasing the dimensions to accommodate vehicles having higher clearance from the ground to the bottom chassis) is possible within the scope of the present disclosure. For example, scaling of the WPT system to increase the dimensions (e.g., to increase the air gap to more than 50 cm) may enable frequencies lower than the VHF band to be used for wireless charging of larger electric vehicles and mobile platforms.

The disclosed WPT system provides a system for wireless charging of electric vehicles and other mobile platforms. The disclosed WPT system may be capable of high power transfer (e.g., power transfer on the order of a few kilowatts or higher). The confinement of the electromagnetic field by the WPT system (e.g., due to the presence of the bandgap structure) may help to ensure that field is confined between the charging plate and the gap waveguide base, and may help to avoid any undesirable radiation effects on bystanders or passengers in the vehicle.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. For examples, although specific waveguiding structures and bandgap structures are disclosed herein, other waveguiding structures and bandgap structures may be used. In another example, although particular applications of the disclosed WPT system may be described herein, the WPT system described may be adapted to other wireless power transfer applications.

The dimensions described herein are meant to be illustrative and not restrictive. The figures may exaggerate or minimize these dimensions for illustrative purposes and/or for ease of reference.

Although the example embodiments may be described with reference to a particular orientation (e.g., top and bottom), this was simply used as a matter of convenience and ease of reference in describing the figures.

Although the present disclosure describes methods and processes with steps in a certain order, one or more steps of the methods and processes may be omitted or altered as appropriate. One or more steps may take place in an order other than that in which they are described, as appropriate.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A wireless power transfer system for wireless transfer of electric power to a mobile platform, the wireless power transfer system comprising:
   a gap waveguide base comprising:
      a first adaptor coupling the gap waveguide base to an external power source providing an electromagnetic field having a frequency in very high frequency (VHF) range;
      a coil-less conductive waveguiding structure coupled to the first adaptor to receive the electromagnetic field from the external power source, the coil-less conductive waveguiding structure being a waveguiding ridge extending along a longitudinal axis of the gap waveguide base that is configured to facilitate propagation of the electromagnetic field along the longitudinal axis of the gap waveguide base; and
      a bandgap structure next to the coil-less conductive waveguiding structure along at least two opposing lateral sides of the coil-less conductive waveguiding structure, the bandgap structure having a periodicity, based on the frequency of the electromagnetic field, prohibiting propagation of the electromagnetic field from the lateral sides of the coil-less conductive waveguiding structure; and
   a charging plate comprising:
      a conductive plate having a receiving structure for receiving the electromagnetic field from the gap waveguide base through an air gap, the receiving structure being a conductive planar surface of the conductive plate that is free of any aperture; and
      a second adaptor coupling the conductive plate to a load to be charged in the mobile platform;
   wherein the gap waveguide base cooperates with the charging plate, when the charging plate is superimposed over and spaced apart from the gap waveguide base, to propagate the electromagnetic field from the coil-less conductive waveguiding structure to the charging plate over the air gap.

2. The wireless power transfer system of claim 1, wherein the gap waveguide base cooperates with the charging plate to propagate the electromagnetic field over the air gap when the charging plate is superimposed over the gap waveguide base, and when the charging plate is spaced apart from the gap waveguide base by a separation distance in the range of about 5 cm to about 50 cm, and wherein the electromagnetic field has a frequency in the range of about 30 MHz to about 300 MHz.

3. The wireless power transfer system of claim 2, wherein the separation distance is in the range of about 10 cm to about 40 cm.

4. The wireless power transfer system of claim 2, wherein the separation distance is in the range of about 15 cm to about 35 cm.

5. The wireless power transfer system of claim 1, wherein the charging plate is mountable to or integral with a bottom of a body of the mobile platform, and the gap waveguide base is underneath a surface supporting the mobile platform.

6. The wireless power transfer system of claim 1, wherein the bandgap structure of the gap waveguide base comprises a plurality of conductive posts, wherein the conductive posts are positioned at a fixed periodicity.

7. The wireless power transfer system of claim 1, wherein the bandgap structure of the gap waveguide base has a height in the range of about 50 cm to about 75 cm.

8. The wireless power transfer system of claim 1, wherein the first adaptor is a first coaxial connector and the second adaptor is a second coaxial connector.

9. The wireless power transfer system of claim 1, wherein the bandgap structure of the gap waveguide base comprises a material with periodic holes, wherein the holes provide the periodicity of the bandgap structure of the gap waveguide base.

10. The wireless power transfer system of claim 1, wherein the electromagnetic field has a frequency in the range of about 30 MHz to about 300 MHz.

11. The wireless power transfer system of claim 1, wherein the bandgap structure is next to the coil-less conductive waveguiding structure along also at least one longitudinal end of the coil-less conductive waveguiding structure.

* * * * *